No. 782,728. PATENTED FEB. 14, 1905.
R. S. CUTTER.
WHEEL.
APPLICATION FILED NOV. 11, 1903.
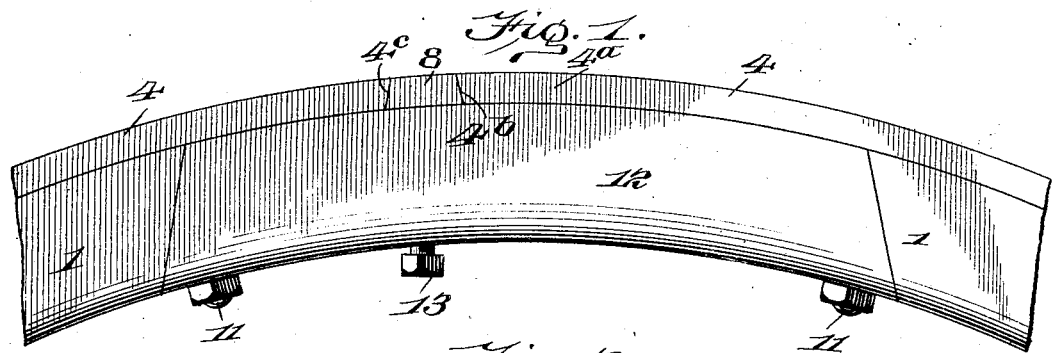
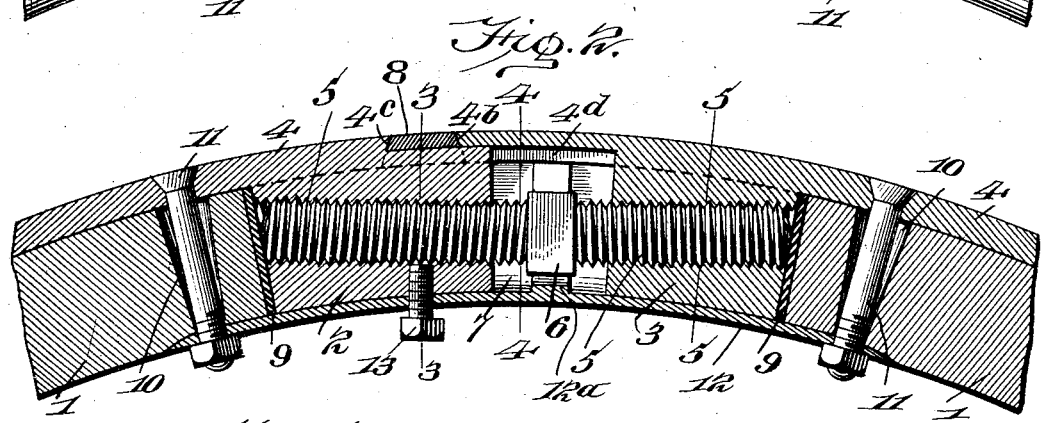
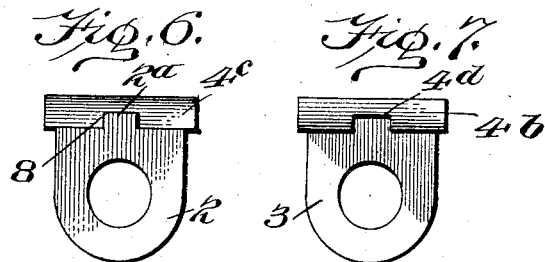

No. 782,728. Patented February 14, 1905.

UNITED STATES PATENT OFFICE.

RICHARD SAMUEL CUTTER, OF LIBERAL, KANSAS.

WHEEL.

SPECIFICATION forming part of Letters Patent No. 782,728, dated February 14, 1905.

Application filed November 11, 1903. Serial No. 180,722.

*To all whom it may concern:*

Be it known that I, RICHARD SAMUEL CUTTER, a citizen of the United States, residing at Liberal, in the county of Seward and State of Kansas, have invented new and useful Improvements in Wheels, of which the following is a specification.

This invention relates especially to improvements in that class of tire-tighteners in which the means for adjusting the tire form a part of the completed wheel.

The primary object of the invention is to make provision for tightening the tire without contracting the felly as the result of such tightening.

A further object is to make provision whereby a removable section of the tire, employed as an exchangeable element for reducing the circumference, will be held securely in place; and a still further object resides in forming a clip for inclosing the adjustable parts which when applied will lock the adjusting-bolt against turning.

To these ends and other minor objects the invention consists in the novel features of construction and the arrangement of parts, all as hereinafter described, and specifically pointed out in the appended claims.

In the accompanying drawings, Figure 1 is a side elevation of a section of wheel-rim constructed in accordance with the invention; Fig. 2, a longitudinal vertical section taken through Fig. 1; Fig. 3, a transverse vertical section taken on line 3 3 of Fig. 2; Fig. 4, a similar section taken on line 4 4 of Fig. 2; Fig. 5, a similar section taken on line 5 5 of Fig. 2; Figs. 6 and 7, end views, respectively, of the terminals of the tire; and Fig. 8, a perspective view of the removable tire-section.

Referring to the drawings, 1 designates the usual felly or rim from which a section has been removed to admit the blocks or lugs 2 and 3, formed integral with the divided tire 4 and on the respective ends thereof, which blocks or lugs, together with the right and left hand screw 5, form the adjustable connection for the terminals of the tire and a substitute for the section of felly removed. A central nut 6 for turning the screw occupies and is operable within the space 7 between the lugs, which space is at all times bridged by the terminal portion $4^a$ of the tire, which seats on the lug 2, said lug being located so as to project beyond its end of the tire for this purpose and in order to bring the division-space between the terminals over said lug. This divsion-space is occupied by a small removable section 8, that completes the tire and is formed with opposite downwardly-diverging sides $8^a$, which correspond, respectively, with the opposing shoulders $4^b$ and $4^c$ of the tire, so that section 8 will be dovetailed in the division-space when said space is contracted to the size of said section. To prevent lateral displacement of the removable section, a longitudinal rib $2^a$ is formed central of the lug 2, which rib fits within a recess $8^b$, formed on the under side of the removable section. The under side of the bridging portion $4^a$ of the tire is provided with a recess or groove $4^d$, which receives a portion of said rib and provides additional strength to the joint, especially against lateral strain.

In the present invention it is the purpose to substitute for the original section 8 a section of slightly-smaller size, as occasion may require, several of these sections of varying size being supplied for this purpose.

The invention may be practiced by forming the tire as though the removable portion 8 was an integral part of one of the terminals and by removing a slight portion thereof by filing when contraction of the tire is necessary. This manner of practicing the invention is contemplated only for very light tires, as on such the reducing operation is not impracticable by filing.

In the normal arrangement of parts the ends of the screw-bolt 5 are in contact with metal plates 9, which are preferably attached to the ends of the felly, and in this manner the bolt forms a permanent brace which prevents the ends of the felly from approaching each other during the tire-tightening operation, thereby neutralizing the effect of such operation. In this connection it will be seen that the felly is provided with bolt-holes 10, which flare outwardly, so that the tire-bolts 11, which pass therethrough and bind the felly between the tire and the clip 12, will be allowed movement at their upper ends without effect upon the felly or clip.

The present invention is shown with a single clip which spans the cut-out section of the felly and incases the tire-adjusting devices. This clip is strengthened by central rib 12ª, formed on the interior of the clip and transversely thereto, which presents two parallel inner walls spaced apart sufficiently to readily admit between them the turning-nut 6 when its edges are brought parallel to the ribs, as shown in Fig. 4. The clip by means of this provision forms a secure lock for the adjusting-bolt. In addition to this locking means a set-screw 13 is provided, and both can be utilized together, the set-screw being relied on to take up any slight play of the bolt, while the function of the clip will be to offer the main resistance against the bolt turning.

Having thus fully described my invention, what I claim, and desire to secure by Letters Patent, is—

1. In a wheel, the combination with a divided tire having overlapping terminals provided with opposite overhanging end walls, a longitudinal rib on the overlapped terminal, of an intermediate detached tire-section adapted to be retained by said walls and rib, and means for adjusting the tire, substantially as and for the purpose set forth.

2. In a wheel, the combination with a divided tire having overlapping terminals, one of which is provided with a rib and the other with a recess to receive said rib, of means for adjusting the tire, substantially as and for the purpose set forth.

In testimony whereof I have signed my name to this specification in the presence of two subscribing witnesses.

RICHARD SAMUEL CUTTER.

Witnesses:
RAY MILLMAN,
FRANK IGOU.